United States Patent

[11] 3,628,970

[72] Inventors Charles R. Stephens, Jr.
East Lyme;
Anibal Torres, New London, both of Conn.
[21] Appl. No. 798,113
[22] Filed Feb. 10, 1969
[45] Patented Dec. 21, 1971
[73] Assignee Pfizer Inc.
New York, N.Y.

[54] FLAVORING AGENT CONTAINING 2-HYDROXY-3-ETHYLCYCLOPENT-2-EN-1-ONE
12 Claims, No Drawings

[52] U.S. Cl. ........................................... 99/140 R, 260/586 R
[51] Int. Cl. ........................................... A23l 1/22, C07c 49/46
[50] Field of Search ............................ 99/140; 260/586 R

[56] References Cited
UNITED STATES PATENTS
3,402,181 9/1968 Erickson et al. ............... 260/586 R

OTHER REFERENCES

Gianturco, " The Synthesis of Some Cyclic Diketones Isolated From Coffee," Tetrahedron, Volume 19, No. 12, (1963), pp. 2039–2042.

Gianturco, " The Structures of Five Cyclic Diketones Isolated from Coffee," Tetrahedron, Volume 19, No. 12, (1963), pp. 2051, and 2056–2058.

Primary Examiner—Morris O. Wolk
Assistant Examiner—Warren R. Bovee
Attorney—Connolly and Hutz ABSTRACT: The use of 2-hydroxy-3-ethylcyclopent-2-en-1-one in edible food compositions represses undesirable flavor notes and enhances desirable flavor notes.

FLAVORING AGENT CONTAINING 2-HYDROXY-3-ETHYLCYCLOPENT-2-EN-1-ONE

BACKGROUND OF THE INVENTION

This invention is based on the discovery that 2-hydroxy-3-ethylcyclopent-2-en-1-one has the ability to repress undesirable flavor notes which are frequently present, to a greater or lesser degree, in food compositions including such items as vegetable oils, proteins or carbohydrates, cocoa, gums, sugar, etc., while enhancing many desirable flavor notes associated with the same compositions including those based on natural ingredients, as well as added natural or artificial flavors. The concentration ranges necessary to obtain such effects are substantially higher than the concentration range (about 0.1 p.p.m.) in which 2-hydroxy-3-ehtylcyclopent-2en-1-one is found as a natural constituent of coffee.

2-hydroxy-3-methylcyclopent-2en-1-one, the adjacent homolog of the active ingredient of the present invention, is known to be useful in compounding flavors for beverages, tobacco, confections and in blending perfumes. As applied to the flavoring of beverages and confections, as well as edible food compositions in general, this homologous compound has a distinctly different flavor from the compound used in the present invention. Moreover, it offers a rough walnutlike odor when used at the higher concentration levels contemplated by the present invention and does not serve to repress undesirable flavor notes in foodstuff compositions.

DETAILED DESCRIPTION OF THE INVENTION

According to the present invention, inclusion of 2–200 p.p.m. of 2-hydroxy-3-ethylcyclopent-2-en-1-one in an edible food composition, the concentration of said cyclopentane compound being based on an as-consumed basis, represses many undesirable flavor notes, while enhancing desirable flavor notes. Moreover, such inclusion does not introduce undesirable flavor notes attributable to the compound itself. By "on an as-consumed basis" as used herein and in the appended claims is meant an edible food composition in final consumption form. For example, powdered milk or other beverage concentrates are not on an as-consumed basis. It is first necessary to add water thereto before they obtain such basis. Hence, if the flavor-enhancing agent of the present invention is added to an edible food prior to its preparation for final consumption, due allowance will have to be made so that the 2–200 p.p.m. range proportion will exist as such on addition of further additives to arrive at the consumable foodstuff, in final form.

Typical examples of edible food compositions include compositions containing any one of, or any combination of any of the following ingredients: vegetable oil, starch, wheat flour, oilseed flours, dried milk or a milk extractive such as milk sugar or sodium caseinate, vegetable protein, protein hydrolysate, microbial protein, yeast extract, gelatin, vegetable gum, corn sugar, cane sugar, cocoa, chocolate, food acids, and artificial flavoring agents including sweeteners.

Oilseed flours are flours derived from the residue obtained in expressing vegetable oils from such seed crops as soybean, cottonseed, sesame, safflower, etc. They are particularly good protein sources but have heretofore been limited in usage because of their objectionable tastes.

Most of the compositions would, of course, also contain water on an as-consumed basis. Beverages, obviously, would be very largely water.

2-hydroxy-3-ethylcyclopent-2-en-1-one may be obtained by direct isolation from coffee or may be synthesized directly. See Tetrahedron (1963), Vol. 19, pp. 2039–2059.

The following examples will serve to illustrate the use of 2-hydroxy-3-ethylcyclopent-2-en-1-one in accordance with the present invention and illustrate its distinct properties as compared with the corresponding 3-methyl compound. However, these examples are not to be considered limiting to the scope of the present invention which is defined by the appended claims.

EXAMPLE I

A preliminary comparison of the taste intensity and quality of 2-hydroxy-3-ethylcyclopent-2en-1-one with the corresponding 3-methyl compound was carried out. Two percent sucrose/water solutions containing 0, 5, 10, 50, 100 and 200 p.p.m. of the two compounds were prepared and appropriately coded. Comparison taste evaluations were made in accordance with the triangle and pair method test. The results of these tests showed that both of the compounds were detectable at 5 p.p.m. This level was therefore considered to be the threshold level for the two compounds. At 10 p.p.m. the taste intensity imparted by the two compounds were judged to be about the same. However, the ethyl compound exerted a smooth sweet taste, while the methyl compound was judged to be less sweet and rougher, characterized as maple-licorice. At the higher p.p.m. levels the foregoing effects were judged to be very pronounced.

EXAMPLE II

In order to determine whether 2-hydroxy-3-ethylcyclopent-2-en-1-one had a superior or inferior flavor effect as compared to the corresponding methyl compound, synthetic caramel and synthetic coconut flavors were prepared as follows:

SYNTHETIC CARAMEL FLAVORS

| Ingredients | Flavor I | Flavor II | Flavor III |
| --- | --- | --- | --- |
| Ethyl Butyrate | 1.00 | 1.00 | 1.00 |
| Benzaldehyde | 0.04 | 0.04 | 0.04 |
| Aldehyde C 10% Solution in Etoh | 0.02 | 0.02 | 0.02 |
| Methyl Furoate | 0.02 | 0.02 | 0.02 |
| Diacetyl | 0.58 | 0.58 | 0.58 |
| Lactic Acid | 0.12 | 0.12 | 0.12 |
| Heliotropine | 0.24 | 0.24 | 0.24 |
| Ethyl Vanillin | 0.78 | 0.78 | 0.78 |
| Benzo Dihydro Pyrone | 0.50 | 0.50 | 0.50 |
| Vanillin | 1.28 | 1.28 | 1.28 |
| 2-hydroxy-3-methylcyclopent-2-en-1-one | 1.00 | — | — |
| 2-hydroxy-3-ethylcyclopent-2-en-1-one | — | 1.00 | — |
| Ethyl Maltol | 1.00 | 1.00 | 1.00 |
| Butyric Acid | 0.50 | 0.50 | 0.50 |
| Ethyl Oxyhydrate | 1.00 | 1.00 | 1.00 |
| Ethyl Alcohol 95% | 50.00 | 50.00 | 51.00 |
| Propylene Glycol | 41.92 | 41.92 | 41.92 |
| Totals | 100.00 | 100.00 | 100.00 |

SYNTHETIC COCONUT FLAVORS

| Ingredients | Flavor I | Flavor II | Flavor III |
| --- | --- | --- | --- |
| Ethyl Maltol | 1.00 | 1.00 | 1.00 |
| Heliotropine | 2.00 | 2.00 | 2.00 |
| Vanillin | 5.00 | 5.00 | 5.00 |
| 2-hydroxy-3-ethylcyclopent-2-en-1-one | — | 5.00 | — |
| 2-hydroxy-3-methylcyclopent- | 5.00 | — | — |
| Butyric Acid | 0.01 | 0.01 | 0.01 |
| Caproic Acid | 0.10 | 0.10 | 0.10 |
| Decanoic Acid | 0.10 | 0.10 | 0.10 |
| Diacetyl | 0.20 | 0.20 | 0.20 |
| Lemon Oil U.S.P. | 0.49 | 0.49 | 0.49 |
| Caprylic Acid | 0.10 | 0.10 | 0.10 |
| Aldehyde $C_{16}$ | 1.90 | 1.90 | 1.90 |
| 6-Methyl Coumarin | 5.00 | 5.00 | 5.00 |
| Aldehyde $C_{14}$ | 0.04 | 0.04 | 0.04 |
| Phenyl Acetaldehyde | 0.04 | 0.04 | 0.04 |
| Oenanthic Ether | 0.04 | 0.04 | 0.04 |
| Ethyl Myristate | 0.02 | 0.02 | 0.02 |
| Ethyl Vanillin | 5.00 | 5.00 | 5.00 |
| Ethyl Caproate | 0.04 | 0.04 | 0.04 |
| Anisic Aldehyde | 0.05 | 0.05 | 0.05 |
| Alcohol 95% | 43.83 | 43.83 | 48.83 |
| Dimethyl Hydroquinone | 0.04 | 0.04 | 0.04 |
| Propylene Glycol | 30.00 | 30.00 | 30.00 |
| Totals | 100.00 | 100.00 | 100.00 |

Organoleptic evaluation of the above flavor blends was undertaken by comparing each flavor versus one another on odor-testing strips and in prepared puddings. The results of these evaluations indicated that the ethyl compound exhibited aroma and taste enhancement substantially superior to the negative controls (flavor III in each instance). Moreover, the aromas and flavors exhibited by the compositions containing the ethyl compound were more natural and the taste obtained by the same compound was smoother and free of harsh notes, as compared to the methyl compound.

EXAMPLE III

Chocolate milk drinks were prepared for the purpose of determining the organoleptic effect of various concentrations of the ethyl compound of the present invention and the corresponding methyl compound. Negative controls were also used.

To investigate the above flavoring effects, it was necessary to prepare a chocolate-base drink which contained no flavor ingredient other than cocoa. This base contained:

```
 1.50 parts of cocoa extract (Anthoine Chiris
 7.50 parts of lactose
21.00 parts of cerelose
29.70 parts of Hershey's Cocoa Powder
 0.30 parts of Centromix (Central Soyalecithin)
80.00 parts of sucrose
 2.00 parts of salt
142.00
```

To 80 parts of the above mixture was added 920 parts milk. To five 100 g. samples of the resulting test solution was added, respectively, 50, 75, 100, 150 and 200 p.p.m. of the ethyl compound. A second set of test solutions containing identical concentrations of the methyl compound was also prepared. A negative control sample was used as the reference sample.

Comparison of the flavoring properties of the foregoing test solutions showed that both compounds assert a definite flavor effect above 50 p.p.m. with the ethyl compound producing the finer and smoother effect. At 100–150 p.p.m. the ethyl compound produced a desirable taste effect characterized as being "roasted chocolate" while the methyl compound was judged to produce an undesirable walnutlike flavor.

EXAMPLE IV

Soya flour has excellent nutritional qualities; however its objectionable beany flavor has limited its use in bakery products.

On the basis of this result 2-hydroxy-3-ethylcyclopent-2-en-1-one and 2-hydroxy-3-methylcyclopent-2-en-1-one were evaluated and organoleptically compared in a cake formulation containing 47 percent soya flour (weight of soy flour = 0.47 × weight of wheat flour) based on the weight of the wheat flour. Comparison of the flavor effects of these two flavor compounds to nontreated control cakes indicated that the ethyl compound at 100 p.p.m. and 150 p.p.m. (calculated on the weight of the baked cakes) definitely improved the odor and taste properties of the cake by suppressing the undesirable beany flavor given by the soya flour. At the same time we noted that the ethyl compound improved the overall flavor qualities of the cakes. The methyl compound at these concentrations contributes to a walnutlike odor and taste; it also showed to give a pronounced bitter aftertaste and did not show to suppress the beany flavor of the soya flour.

To compare the flavor effects of the 3-ethyl and 3-methyl compounds, we selected a cake formulation containing 47 percent soya flour/cake flour ratio. This was prepared according to the following formulation:

Cake Formula Containing 47% Soya Flour/Wheat Flour Ratio

| Ingredients | Weight in Grams |
| --- | --- |
| Vanilla Powder Flavor 20-Fold | 0.125 |
| Sugar | 72.000 |
| Salt | 1.500 |
| Nonfat Milk Solid | 6.000 |
| Shortening (Crisco) Proctor & Gamble Product | 46.000 |
| Beaten Whole Eggs | 46.000 |
| Water | 77.000 |
| Wheat Flour | 69.300 |
| Fleischmann's Baking Powder | 6.000 |
| Defatted Soya Flour Containing 0.8% Lecithin, 54.5% Protein | 32.700 |
| Total | 356.625 |

This formula yields 324.5 grams of baked goods.

Ten baked formulations containing separately 25, 50, 75, 100, and 150 p.p.m. of the 3-ethyl and 3-methyl compound and one formulation containing no methyl or ethyl compound (nontreated control) were organoleptically evaluated and compared using the pair comparison method test.

The results of these tests indicated that the ethyl compound at 25 p.p.m. did not contribute to any flavor improvement. At 50 p.p.m. and 75 p.p.m. it showed a moderate improvement of the cake flavor by suppressing the beany flavor which was noted on the nontreated control cakes and cakes containing the methyl compound. At 100 p.p.m. and 150 p.p.m. the ethyl compound exhibited the most desirable and preferred enhancing properties as it exhibited to suppress completely the beany taste of the cakes without producing any flavor of its own. At these concentrations we also noted that the ethyl compound improved the sweetness effect and the vanilla flavor of the cakes.

Contrary to these results we noted that the 3-methyl compound at 25, 50, and 75 p.p.m. showed to intensify the objectionable beany taste of the cakes. At 100 p.p.m. and 150 p.p.m. it contributed to a flavor of its own by imparting to the cakes a walnutlike odor and taste with a pronounced bitter aftertaste and did not show to suppress the beany flavor of the cakes.

In similar tests in which the soya flour was increased by 50 percent, cakes with abnormal structure and color resulted. Nevertheless the 3-ethyl compound was found to suppress the beany flavor of these cakes at 200 p.p.m. (calculated on the weight of the baked cakes).

Based on these applications and organoleptic evaluations, it was evidenced that the 3-ethyl compound has the outstanding property of suppressing the beany flavor of the soya flour in baked goods.

Similar experiments substituting other oilseed flours (sesame flour, safflower seed flour, cottonseed meal, etc. also demonstrated a favorable effect with the 3-ethyl compound.

A comparable experiment was also conducted in which no oilseed flour was added —i.e., the test cakes were prepared using only the normal wheat flour. In this instance the ethyl compound was also observed to improve the flavor of the cake at concentrations about 50–150 p.p.m., whereas the methyl compound imparted an undesirable flavor.

EXAMPLE V

Low-calorie kola carbonated beverage samples (Coca-Cola Tab beverage) containing 10, 15, 20, 25, and 50 p.p.m. of 2-hydroxy-3-ethylcyclopent-2-en-1-one and 2-hydroxy-3-methylcyclopent-2-en-1-one were organoleptically compared to a nontreated control sample.

Test results indicated that the 3-ethyl compound at 10 p.p.m. showed to improve the flavor qualities of the beverage by suppressing the undesirable bitter aftertaste. At 15, 20, and 25 p.p.m. the 3-ethyl compound also demonstrated to intensify the kola nut flavor and to intensify the sweetness of the beverage. However, at 50 p.p.m. it produced a change in the flavor quality of the beverage which was judged nondesirable.

The beverage containing the 3-methyl compound did not contribute to any desirable flavor effects as it showed to produce an adverse flavor effect. At 10 p.p.m. and 15 p.p.m. it exhibited to intensify the bitter aftertaste of the beverage. At 20, 25, and 50 p.p.m. it produced a pronounced phenoliclike flavor.

EXAMPLE VI

Organoleptic evaluation of 2-hydroxy-3-ethylcyclopent-2-en-1-one ("Compound I") and the corresponding 3-methyl compound ("Compound II") was conducted in a variety of edible food compositions or in solutions containing specific food ingredients or additives. Nontreated control samples were employed. Comparison of the flavor effects of these two tested compounds indicated that an improvement of the qualities of either the taste or odor or both can be achieved by incorporating between 2 and 200 p.p.m. (calculated on the as-consumed basis) of compound I. On the other hand, compound II, at corresponding concentrations, either exhibited no improvement or displayed a nondesirable flavor effect in that it was found to contribute a nutty, walnutlike note causing an unnatural flavor change in the food composition. The following tabulation identifies the food compositions and the observations made. The p.p.m. represents the range concentration at which the most desirable effects for compound I were obtained.

| Product or substance treated | Compound I, p.p.m. | Compound II, p.p.m. | Results |
| --- | --- | --- | --- |
| Hydrogenated coconut oil | 50-75 | | Suppress the oily odor and taste. Thereby a more bland, desirable flavor was detected. |
| Do | | 50-75 | A nutty odor and taste was detected, which caused a flavor change of the oil. |
| Olive Oil | 75-150 | | Suppresses the oily odor and taste, intensifies the olive aroma and taste. |
| Do | | 75-150 | Exerted a walnut-like note, which makes the oil less refined. |
| Corn oil | 50-100 | | Suppress the unpleasant oily taste and odor. Makes the oil flavor finer. |
| Do | | 50-100 | Exerted a rougher crude oil character. Slight nutty taste was detected. |
| Soya bean oil | 50-100 | | Depress the oily taste and odor. Smoother, bland taste was noted. |
| Do | | 50-100 | A rougher walnut aroma and taste was noted. |
| Sesame oil | 50-100 | | Depression of the unpleasant oily odor and taste was detected. Refined flavor properties were achieved. |
| Do | | 50-100 | An undesirable walnut, rougher flavor note was detected. |
| Cottonseed oil | 100-150 | | Suppression of the unpleasant oily odor and taste. A bland taste and neutral odor was observed. |
| Do | | 100-150 | A rougher crude oily taste and odor was observed. |
| 1.8% gelatin 230 bloom in 15% sugar/water. | 75-100 | | Suppression of noxious odor and taste associated with the gelatin. An intense sweeter taste was noted. |
| Do | | 75-100 | Intensifies the noxious odor and taste of the gelatin. A rougher and less sweeter taste was noted. |
| 1% sodium caseinate in $H_2O$ | 20-25 | | Depression of so-called cardboard-like odor and taste of sodium caseinate was noted. |
| Do | | 20-25 | A stronger cardboard-like odor and taste was noted. |
| 3% hydrolyzed plant protein powder in $H_2O$. | 200 | | Improvement of the odor, taste, and mouth feel of the meaty flavor was noted. |
| Do | | 200 | Strong unpleasant walnut bitter aftertaste was noted. |
| 0.2% of 9:1 calcium cyclamate/sodium saccharin in $H_2O$. | 5 | | An improved smoother sweeter taste was noted. Suppression of bitter taste was also detected. |
| Do | | 5 | Stronger bitter taste was noted. Methylcyclopentenolone enhances the undesirable bitter taste. |
| 10% sucrose in $H_2O$ | 3-5 | | Slightly sweeter, smoother taste effect was noted. |
| Do | | 3-5 | No favorable or desirable flavor effect was noted by the addition of methylcyclopentenolone. |
| 5% gum tragacanth in $H_2O$ | 125 | | Suppression of the unpleasant gummy taste without producing any taste or odor of its own was noted. |
| Do | | 125 | A distinct burnt, nutty taste was detected. These effects were also noted in the odor. |
| 5% gum arabic in water | 100 | | Suppression of the unpleasant gummy taste. An improved, slightly smoother sweet taste was observed. |
| Do | | 100 | A distinct non-pleasant burnt, nutty odor and taste was noted. |
| 12% skim milk powder in $H_2O$ | 75-100 | | A definite cleaner odor and taste, as well as a more intense true-milk taste, was noted. |
| 12% skim milk powder in $H_2O$ | | 75-100 | A distinct rougher, nutty taste, and odor was detected. |
| 5% cremora nondairy coffee whitener in $H_2O$. | 100-125 | | Suppression of the unpleasant sodium caseinate odor and taste and chalky flavor was detected. |
| Do | | 100-125 | A strong nutty odor and taste at these concentrations was observed. |
| 15% cerelose in $H_2O$ | 5-10 | | An improved long-lasting sweeter effect was noted without producing any flavor effects of its own. |
| Do | | 5-10 | An off-odor and taste "nutty-like" was noted. |
| 0.2% citric acid in 12% sugar/water | 25-50 | | A more intense, smoother, sweeter-tart taste was noted. |
| Do | | 25-50 | A non-desirable nutty odor and taste was detected. |
| 0.1% tartaric acid in 12% sugar/water | 25-50 | | An improved, more intense smoother sweet-tart taste was noted. |
| Do | | 25-50 | A detectable odor and taste of methylcyclopentenolone was noted. |
| 0.2% fumaric acid with 0.3% D.S.S. in 12% sugar/water. | 25 | | Suppression of the D.S.S. bitter taste and intense sweeter-tart taste was observed. |
| Do | | 25 | A definite non-desirable stronger bitter taste of the D.S.S. was noted. |
| Cooked corn starch containing 10% sugar. | 125-150 | | An improved smoother, sweeter taste was noted without producing any taste or odor of its own. |
| Do | | 125-150 | An unpleasant nutty, rougher taste, and odor was detected. |
| 3% autolyzed yeast paste in $H_2O$ | 125-150 | | An improved cleaner odor and taste, as well as significant improvement in mouth feel, was achieved. |
| Do | | 125-150 | A less cleaner and rougher odor and taste was detected. |

What is claimed is:

1. An edible food composition containing 2-hydroxy-3-ethylcyclopent-2-en-1-one at a concentration, on an as-consumed basis, of 2-200 p.p.m.

2. The edible food composition of claim 1 wherein said edible food contains at least one proteinaceous material selected from the group consisting of oilseed flour, dried milk, milk extractive, vegetable protein, protein hydrolysate, microbial protein, yeast extract, and gelatin.

3. The composition of claim 1, including a flavor additive.

4. The composition of claim 3 wherein said additive is chocolate flavored.

5. A process for repressing undesirable flavor notes and enhancing desirable flavor notes in an edible food composition which comprises adding to said composition from 2-200 p.p.m. on an as-consumed basis, of 2-hydroxy-3-ethylcyclopent-2-en-1-one.

6. The process of claim 5 wherein said edible food contains at least one proteinaceous material selected from the group consisting of oilseed flour, dried milk, milk extractive, vegetable protein, protein hydrolysate, microbial protein, yeast extract, and gelatin.

7. The edible food composition of claim 1 wherein said edible food contains at least one carbohydrate material selected from the group consisting of starch, wheat flour, corn sugar, and cane sugar.

8. The edible food composition of claim 1 wherein said edible food contains at least one flavor additive material selected from the group consisting of synthetic flavors, synthetic sweeteners, food acids, cocoa, and chocolate.

9. The edible food composition of claim 1 wherein said edible food contains at least one material selected from the group consisting of vegetable gum and vegetable oil.

10. The process of claim 5 wherein said edible food contains at least one carbohydrate material selected from the group consisting of starch, wheat flour, corn sugar, and cane sugar.

11. The process of claim 5 wherein said edible food contains at least one flavor additive material selected from the group consisting of synthetic flavors, synthetic sweeteners, food acids, cocoa, and chocolate.

12. The process of claim 5 wherein said edible food contains at least one material selected from the group consisting of vegetable gum and vegetable oil.

* * * * *

PO-1050
(5/69)

UNITED STATES PATENT OFFICE
CERTIFICATE OF CORRECTION

Patent No. 3,628,970        Dated December 21, 1971

Inventor(s) Charles R. Stephens, Jr. and Anibal Torres

It is certified that error appears in the above-identified patent and that said Letters Patent are hereby corrected as shown below:

In the title change "Z-HYDROXY-3-ETHYLCYCLOPENT-Z-EN-1-ONE" to -- 2-HYDROXY-3-ETHYLCYCLOPENT-2-EN-1-ONE --.

Signed and sealed this 26th day of September 1972.

(SEAL)
Attest:

EDWARD M. FLETCHER, JR.                          ROBERT GOTTSCHALK
Attesting Officer                                      Commissioner of Patents